US010985998B1

(12) United States Patent
Gujar et al.

(10) Patent No.: US 10,985,998 B1
(45) Date of Patent: Apr. 20, 2021

(54) DOMAIN CONTROLLER CONFIGURABILITY FOR DIRECTORIES

(71) Applicant: Amazon Technologies, Inc., Seattle, WA (US)

(72) Inventors: Sachin Sanjay Gujar, Bellevue, WA (US); Nitish Goyal, Bellevue, WA (US); Ming Chan, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 207 days.

(21) Appl. No.: 15/985,506

(22) Filed: May 21, 2018

(51) Int. Cl.
H04L 12/24 (2006.01)
H04L 29/12 (2006.01)
H04L 12/46 (2006.01)

(52) U.S. Cl.
CPC ...... H04L 41/5051 (2013.01); H04L 12/4641 (2013.01); H04L 41/0816 (2013.01); H04L 61/1541 (2013.01)

(58) Field of Classification Search
CPC ............ H04L 41/0645; H04L 41/4641; H04L 41/0816; H04L 61/1541
See application file for complete search history.

(56) References Cited

U.S. PATENT DOCUMENTS

| 8,528,057 | B1* | 9/2013 | Garrett | H04L 63/0815 380/201 |
| 8,997,093 | B2* | 3/2015 | Dimitrov | G06F 8/61 718/1 |
| 10,009,443 | B1* | 6/2018 | Guigli | H04L 47/783 |
| 2006/0074618 | A1* | 4/2006 | Miller | G06F 9/45504 703/13 |
| 2008/0104661 | A1* | 5/2008 | Levin | G06F 21/6218 726/1 |
| 2011/0047206 | A1* | 2/2011 | Spears | G06F 21/604 709/203 |
| 2014/0019960 | A1* | 1/2014 | Jacklin | G06F 9/5077 718/1 |
| 2016/0056975 | A1* | 2/2016 | Marin | H04L 67/10 709/220 |
| 2017/0048223 | A1* | 2/2017 | Anantha Padmanaban | H04L 61/1511 |
| 2017/0286605 | A1* | 10/2017 | Wong | H04L 41/082 |

OTHER PUBLICATIONS

Pereira, P., "How to Increase the Redundancy and Performance of Your AWS Directory Service for Microsoft AD Directory by Adding Domain Controllers," AWS Security Blog, Jul. 2017, 7 pages.

* cited by examiner

Primary Examiner — Benjamin M Thieu
(74) Attorney, Agent, or Firm — Davis Wright Tremaine LLP

(57) ABSTRACT

A managed directory service receives a request to add a domain controller to a directory. In response to the request, the managed directory service determines, based on locations of other domain controllers of the directory, a location for the domain controller. The managed directory service provisions the domain controller at the location and associates the domain controller to the directory. The domain controller is activated in order to perform directory operations for the directory.

20 Claims, 8 Drawing Sheets

DOMAIN CONTROLLER CONFIGURABILITY FOR DIRECTORIES

BACKGROUND

Customers of computing resource service providers (often referred to as "cloud providers") often utilize directory services to create and maintain directories for their resources (e.g., file systems, files, users, security policies, network resources, applications, system storage, etc.) for data management and for access to a variety of resources. These directories are often created with domain controllers, which are used to authenticate users of these directories and to regulate access to the variety of resources associated with the directories. However, as more users attempt to access the variety of resources, the authentication load of these domain controllers may increase. Ensuring that these domain controllers can support this authentication load can be difficult. Further, ensuring availability of these domain controllers in the event of a failure at a particular data center or other location can also be difficult.

BRIEF DESCRIPTION OF THE DRAWINGS

Various techniques will be described with reference to the drawings, in which.

DETAILED DESCRIPTION

Figure 1:
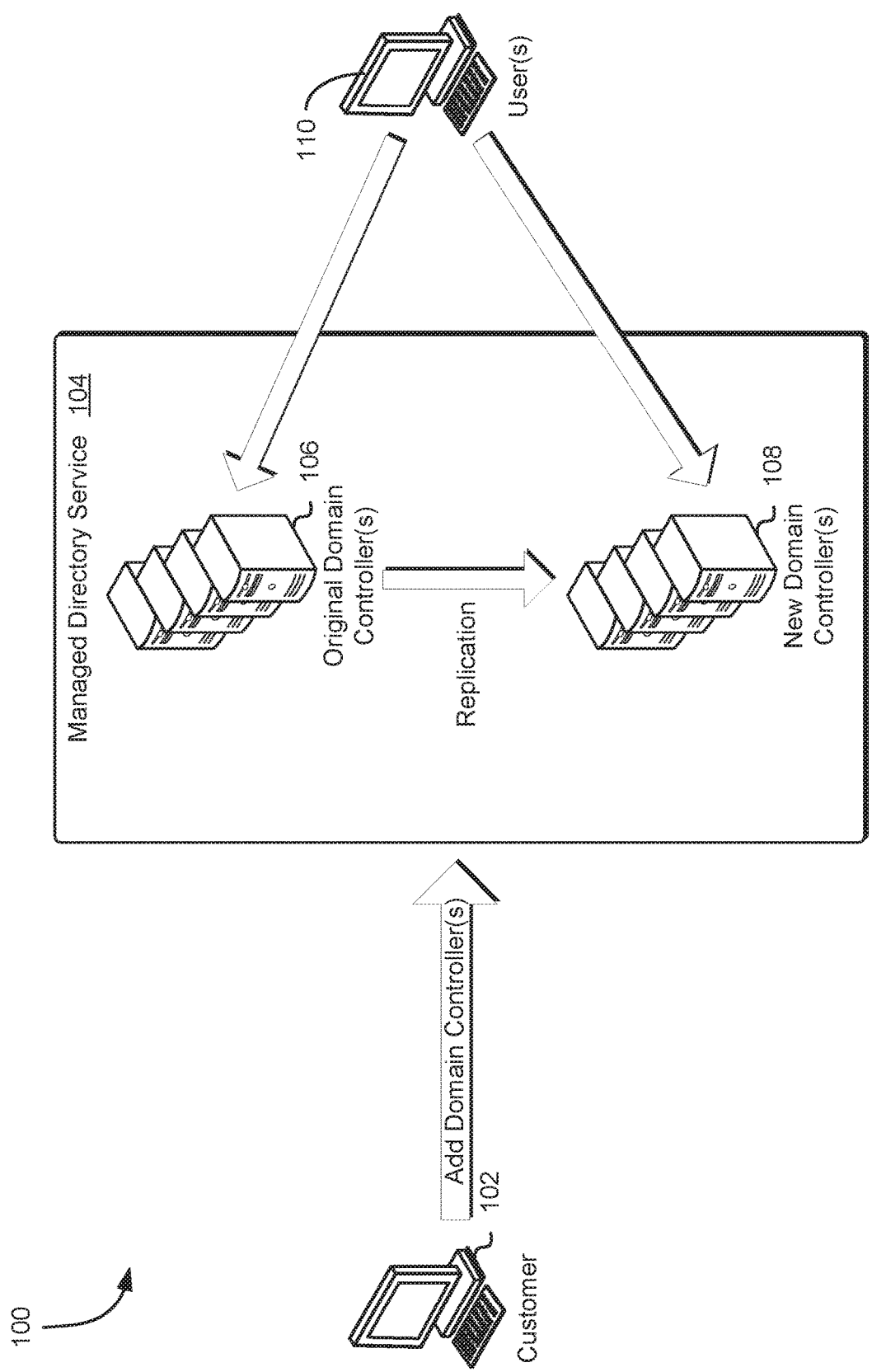
FIG. 1 shows an illustrative example of a system in which various embodiments can be implemented.

Techniques described and suggested herein relate to the creation and use of domain controllers to support authentication requests associated with a directory. In an embodiment, a managed directory service receives a request from a customer to deploy additional domain controllers for a particular directory of the customer. The directory is created by the managed directory service with a default set of domain controllers. This default set of domain controllers, in an embodiment, is deployed among a set of data zones to provide availability of this default set of domain controllers in the event that a particular data zone is rendered unavailable. In an embodiment, the request specifies a number of domain controllers that is greater than the number of domain controllers in the default set of domain controllers. In response to the request, the managed directory service creates an auto-scaling group for the directory and identifies the one or more data zones that are to include the additional domain controllers.

In an embodiment, the managed directory service instantiates the additional domain controllers in the one or more data zones identified by the managed directory service as being capable of supporting these additional domain controllers. Further, the managed directory service creates one or more network interfaces in subnets in the customer's account based on a balancing of the additional domain controllers among the subnets. For each of these additional domain controllers, the managed directory service also assigns a unique Internet Protocol (IP) address. The managed directory service also causes the default set of domain controllers to replicate their data on to the additional domain controllers in order to provide the same functionality across the directory. Once the data has been successfully replicated on to the additional domain controllers, the managed directory service activates the additional domain controllers and makes them available for use in regulating access to the directory.

In an embodiment, the managed directory service monitors the domain controllers of a directory to identify any issues that may impact performance or availability of any of the domain controllers of the directory. If the managed directory service detects an issue with one or more subnets of the directory or with the directory itself, the managed directory service determine the impact to the domain controllers of the directory. If the issue cannot be resolved and the issue results in one or more domain controllers being unavailable for use, the managed directory service identifies the number of desired domain controllers specified by the customer in its configuration of the directory. If the number of remaining domain controllers is less than the number of desired domain controllers specified by the customer, the managed directory service provisions additional domain controllers to satisfy the customer's requirement. The managed directory service continues to monitor these domain controllers to ensure that the customer's requirement is satisfied in the event of any new issues.

In an embodiment, the managed directory service also processes requests to reduce the number of domain controllers for a particular directory. In response to such a request, the managed directory service determines, for the directory, the number of remaining domain controllers if the domain controllers are removed in accordance with the request. If the number of remaining domain controllers would fail to satisfy a minimum threshold for the directory, the managed directory service denies the request, as a number of default domain controllers are needed to support the directory. However, if the resulting number of domain controllers of the directory would satisfy the minimum threshold, the managed directory service can remove these additional domain controllers.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

As one skilled in the art will appreciate in light of this disclosure, certain embodiments may be capable of achieving certain advantages. For instance, enabling customers to expand the number of domain controllers for their directories increases the redundancy and performance of the directory. This results in greater resilience and higher availability of the directory in the event an issue is detected that impacts one or more data zones. Further, enabling the provisioning of additional domain controllers for a directory improves the performance of the directory by enabling customers to load-balance their requests across a larger number of domain controllers. The removal of any of these additional domain controllers at any time further enables a customer to reduce the cost of maintaining its directory during off-peak times, when the number of requests to access the directory may be reduced.

FIG. 1 shows an illustrative example of a system 100 in which various embodiments can be implemented. In the system 100, a customer 102 submits a request to a managed directory service 104 to provision one or more new domain controllers 108 for a directory. In an embodiment, the managed directory service 104 provides a variety of services to enable computer systems and/or computer system client devices to access system resources including, but not limited to, authentication, authorization and directory services. The managed directory service 104, in one embodiment, provides authentication services which are used to authenticate credentials of a user, computer system, process, automated process or other such entity to at least determine whether that entity is authorized to access the managed directory service 104 and/or the system resources associated with the managed directory service 104. In one embodiment, the credentials are authenticated by the managed directory service 104 itself, or by a process, program, or service under the control of the managed directory service 104, or by a process, program or service that the managed directory service 104 communicates with, or by a combination of these and/or other such services or entities.

In an embodiment, the managed directory service 104 also provides authorization services which are used to authorize a user, computer system, process, automated process or other such entity to at least determine which actions of one or more possible actions that entity is authorized to perform. In the case of a computer system resource such as a file system resource, actions that an entity is or is not authorized to perform include, but are not limited to, creating file systems on the file system resource, destroying file systems on the file system resource, attaching to file systems on the file system resource, detaching from file systems on the file system resource, providing access links to file systems on the file system resource, reclaiming access links to file systems on the file system resource, allowing reads from file systems on the file system resource, allowing writes to file systems on the file system resource and/or other such file system resource actions.

Actions on system resources include, but are not limited to, actions on directories, files, applications, data, databases, links to other resources, system drivers, operating systems, virtual machines and/or other such system resource objects thereon and may include such actions as the actions mentioned herein. Actions to start, stop, reclaim, destroy and/or otherwise manage the system resources as well as other such actions are also included in the available actions. Authorization to perform actions are managed by an entity such as a credentialing or policy system such as a system that maintains a set of credentials and/or policies related to a certain entity and determines, based at least in part on the set of credentials and/or policies which actions an entity is authorized to perform. The actions that an entity is authorized to perform are static or vary according to a number of factors including, but not limited to, time of day, type of credentials, system policies, nature, type or location of the object being accessed or a combination of these and/or other such authorization factors. In one embodiment, a computer system entity is authorized only to read certain files on a file system, to read and write certain other files on a file system, and to add and delete certain other files on a file system. A different computer system entity is authorized to perform any actions on the file system, but only if those actions are initiated from a certain location and at a certain time. In one embodiment, one or more processes are authorized only to write to a file on a file system, such as, for example, a system log, while other processes are only be authorized to read from the file. Other types of operations that are authorized by the managed directory service authorization system and such other types of operations are also considered as being within the scope of the present disclosure.

The managed directory service 104, in an embodiment, also provides directory services which provide an authenticated entity access to computer system resources according to the authorization credentials and/or policies. The directory services are web-based computer systems that host or otherwise provide access to directories. In an embodiment where a computer system entity is authorized to read and write a certain data store on a computer system resource such as a file system resource, the ability to do so is provided by the directory services. Directory services also provide access to the file system resource by providing links to the file system resource locations such as by a Uniform Resource Identifier (URI) object or some other such linkage. The URI is provided by the computer system client device, or by a process running at the data center, or by a process running on a computer system connected to the datacenter, or by the managed directory service 104 or by a combination of these and/or other such computer system entities.

In an embodiment, the customer 102 maintains a private network (PN) to launch and manage resources in a virtual networking environment. The PN includes a set of subnets, defined by the customer 102 of by a computing resource service provider, to enable users 110 to access the PN and the resources provided therein. Each subnet of the PN is executed within a distinct data zone of the computing resource service provider in order to ensure availability of the PN in the event that a data zone is rendered unavailable. In an embodiment, data zones are logical groupings of resources according to a definition of the zones. A zone, for example, in an embodiment, is defined geographically (e.g., by geographic region, by data center, by data center room, by rack, etc.), but can be defined in other ways, such as according to a fault boundary, according to tags associated in a database with the resources, and/or in other ways. For instance, each geographic region managed and operated by the computing resource service provider may comprise a number of isolated locations (e.g., data zones). Thus, if there is an issue within a particular data zone, access to the PN can still be achieved via a subnet in another data zone of the computing resource service provider. In an embodiment, the PN is a virtual private network.

In an embodiment, a directory provided by the managed directory service 104 is provisioned with a set of original domain controllers 106, which are considered the default domain controllers for the directory. In creating the directory for its PN, the customer 102 provides an identifier corresponding to the PN of the customer 102 and identifiers corresponding to the subnets of the PN. The managed directory service 104, in an embodiment, assigns an IP address to each of the set of original domain controllers 106 to enable the set of original domain controllers 106 to authenticate requests to access the PN and the resources therein. In an embodiment, the managed directory service 104 distributes the set of original domain controllers 106 in accordance to a balancing schema (also referred to as "balancing logic") to ensure the availability of at least one domain controller in the event of a subnet or data zone failure. For example, if the PN subnets are located within two distinct data zones, the managed directory service 104 balances the set of original domain controllers 106 among these two distinct data zones evenly. In an embodiment, a balancing schema is data that at least partially indicates how to select locations for domain controllers. In an embodiment, the balancing schema defines a set of rules for placement of the domain controllers of the directory within the various data zones of the PN. The balancing schema can be implemented via a rules engine, parameters for an algorithm for selecting a data zone for placement of a domain controller, etc. In an embodiment, the balancing schema is configured to locate domain controllers to favor even distribution of domain controllers of a directory among a plurality of data zones. As an example, in an embodiment, if a directory has more domain controllers in one zone than in another zone, the balancing schema may cause a new domain controller to be placed in the other zone. As another example, in an embodiment, if a directory has an even number of domain controllers in each of a plurality of zones, the balancing schema may be configured to cause one of the plurality of zones to be randomly or otherwise selected for a new domain controller. As yet another example, in an embodiment, if a directory has an even number of domain controllers in each of a plurality of zones, the balancing schema may be configured to cause a new domain controller to be placed in a new zone to further distribute domain controllers among data zones. In yet another embodiment, the balancing schema comprises a set of parameters for a ranking algorithm that ranks possible locations for domain controllers so that locations for new domain controllers can be selected according to a ranking generated in accordance with the ranking algorithm. The algorithm, in an embodiment, optimizes one or more variables, such as distance, latency, existing placements according to one or more constraints, such as constraints how many domain controllers can be in a zone, which may be absolute and/or relative (e.g., depending on domain controllers of the directory in other zones).

In an embodiment, each domain controller is implemented on a computer system or abstraction thereof (such as one or more virtual machines operating via a hypervisor), implemented using hardware and software, and can comprise one or more processors and memory that stores executable instructions whose execution by the one or more processors causes the computer system to perform operations described herein. Each domain controller controls access to the PN and to resources within the directory. For instance, a domain controller stores account information of the directory and, accordingly, authenticates users 110 attempting to access the PN and the resources provided therein. Thus, the set of original domain controllers 106 provisioned by the managed directory service 104 provides an authentication mechanism for enabling access to the PN via the various subnets of the PN.

In an embodiment, the managed directory service 104 enables the customer 102 and other entities to submit a request, via an application programming interface (API) call (e.g., "UpdateDesiredNumberofDomainControllers( )"), to update the number of desired domain controllers for the PN. This request can specify an identifier corresponding to the customer's directory, as well as an identifier of the customer 102 and the directory type of the customer's directory. Through the definition of a new number of desired domain controllers, the customer 102 can specify whether it wishes to add domain controllers to its PN or to terminate existing domain controllers from the PN. In an embodiment, the managed directory service 104 also enables the customer 102 to request, via another API call (e.g., "DescribeDomainControllers( )"), a description of the domain controllers of its PN. In response to this API call, the managed directory service 104 returns network information for each domain controller of the PN. This information includes, for each domain controller: a directory identifier, a domain controller identifier, a PN identifier, a subnet identifier, a data zone identifier, an IP address for the domain controller, a status identifier for the domain controller, a timestamp corresponding to the launch time of the domain controller, etc.

In an embodiment, the API input for requesting a description of the domain controllers of a PN is structured as such:
{
"DirectoryId": "d-1234567890",
"NextToken": "foo", // Optional
"Limit": "1"// Optional
}
Further, the response to this API input is structured as such:
{"DomainControllers":
[
{"DirectoryId": "d-1234567890",
"DomainControllerId": "dc-1234567890",
"PNId": "PN-a60f11c3",
"SubnetId": "subnet-2154481b",
"DataZone": "capital-w1-1e",
"DnsIpAddr": "172.31.0.11",
"Status": "Active",
"LaunchTime": "1459981416.238"},
{"DirectoryId": "d-1234567890",
"DomainControllerId": "dc-1234567891",
"PNId": "PN-a60f11c3",
"SubnetId": "subnet-2154481b",
"DataZone": "capital-w1-1w",
"DnsIpAddr": "172.31.0.12",
"Status": "Active",
"LaunchTime": "1459981416.238"},
]
}

In an embodiment, the customer 102 requests creation of a set of new domain controllers 108 for its PN. For example, if the PN is subject to additional user demand, the customer 102 may submit a request to create a set of new domain controllers 108 to handle this additional demand for access to the PN and the resources therein. In an embodiment, the request specifies a desired number of domain controllers for the customer's PN, wherein the number specified may be greater than the number of original domain controllers 106 of the PN. In response to the request, the managed directory service 104 determines whether new domain controllers 108 are required based on the number of desired domain controllers specified in the request. In an embodiment, if the number of desired domain controllers specified in the request is greater than the number of original domain controllers 106 of the PN, the managed directory service 104 adds entries in a domain controllers table corresponding to each new domain controller that is to be created. Each entry may be created with and indicator that the new domain controller is in a "creation" state.

In an embodiment, the managed directory service 104 creates a new auto-scaling group in the customer's managed directory service account for its directory if the desired number of domain controllers is greater than the number of original domain controllers 106. The capacity of the new auto-scaling group is set to the desired number of domain controllers for the PN minus the number of original domain controllers 106 currently operating within the PN. In an embodiment, the managed directory service 104 further creates a network interface in the corresponding subnets of the PN. A network interface is a logical networking component in the PN that represents a virtual network card. The network interface can include one or more IP addresses from a range of IP addresses of the PN. The managed directory service 104 determines how many network interfaces are to be created in each subnet based on a balancing of the resources usable to instantiate the new domain controllers 108. For instance, the auto-scaling group evaluates the subnets of the PN within the various data zones to determine where resources corresponding to the original domain controllers 106 are located. The auto-scaling group can distribute the resources usable to instantiate the new domain controllers 108 such that the new domain controllers 108 and the original domain controllers 106 are distributed among the various data zones (e.g., subnets) of the PN such that, in the event of a failure in a particular data zone, domain controllers are available for the PN, thus preventing correlated failure of the domain controllers of the PN.

In an embodiment, the managed directory service 104 assigns, for each new domain controller 108, an IP address and creates the resources within the identified data zones for the new domain controllers 108. Further, the managed directory service 104 initiates monitoring of the new domain controllers 108, such that in the event of a failure or other event that impacts performance of a new domain controller, the failure or other event may be detected by the managed directory service 104 and resolved. In an embodiment, the managed directory service 104 updates entries corresponding to the new domain controllers 108 in a directory database to specify the network information for each new domain controller 108. An entry for a particular domain controller may specify the subnet and data zone the domain controller is located in, an identifier corresponding to the customer's PN, an identifier corresponding to the customer's directory, the network interface associated with the domain controller, the IP address of the domain controller, and the like. In an embodiment, the managed directory service causes the original domain controllers 106 to replicate their data on to the new domain controllers 108 of the PN. This enables the new domain controllers 108 to perform network authentication functions in a manner as that of the original domain controllers 106 of the PN. The managed directory service 104 activates the new domain controllers 108, which may now process incoming network traffic and authenticate users 110 attempting to access the PN to utilize resources within the customer's directory.

In an embodiment, the managed directory service 104 monitors the domain controllers of the PN to determine whether any issues are impacting performance of any of the domain controllers or of the subnets and data zones in which these domain controllers are located. For instance, the managed directory service 104 obtains metrics corresponding to the performance of each domain controller of the PN. Based on these metrics, the managed directory service 104 determines whether there is an issue impacting performance of one or more domain controllers. If an issue is detected, whether it is with a specific domain controller, a subnet of the PN, or a particular data zone, the managed directory service 104 identifies the one or more domain controllers of the PN that are impacted by the issue. Further, the managed directory service 104 performs one or more mitigating actions to resolve the identified issue. For example, if a particular domain controller is experiencing heavier than usual network traffic while other domain controllers are experiencing lighter network traffic loads, the managed directory service 104 can redirect network traffic to other domain controllers of the PN to balance the network traffic of the PN.

In an embodiment, if the issue cannot be resolved without impacting the performance and/or availability of one or more domain controllers, the managed directory service 104 accesses the directory database to identify the number of desired domain controllers for the PN. If one or more domain controllers are unavailable or are to be made unavailable in order to resolve the detected issue, the managed directory service 104 determines whether the number of remaining domain controllers of the PN is less than the number of desired domain controllers for the PN, as specified in the directory database. If the number of remaining domain controllers is less than the number of desired domain controllers for the PN, the managed directory service 104 provisions new domain controllers 108 to satisfy the requirement of desired domain controllers for the PN. The process for provisioning the new domain controllers 108 to replace unavailable or impaired domain controllers is similar to that described above in connection with processing of a customer 102 request to provision additional domain controllers for its PN by specifying a new number of desired domain controllers.

In an embodiment, the customer 102 specifies, in a request, a number of the desired domain controllers for its PN that is less than the number of domain controllers in operation for the PN. This may serve as an indication that customer 102 wants to scale in the number of domain controllers of its PN. For instance, the customer 102 may wish to reduce the number of active domain controllers of its PN if there is a significant lull in network traffic and/or the customer 102 wishes to reduce the cost of maintaining its PN. The managed directory service 104, in response to the request, updates the desired capacity of the auto-scaling group of the new domain controllers 108 to the desired number of domain controllers minus the number of original domain controllers 106 (e.g., default domain controllers) of the PN. In an embodiment, if the number of desired domain controllers is equal to the number of original domain controllers 106 of the PN, the managed directory service 104 deletes the auto-scaling group, as the PN will no longer maintain new domain controllers 108 for the PN.

In an embodiment, the managed directory service 104, through the auto-scaling group of the new domain controllers 108, determines which domain controllers are to be terminated in order for the PN to have a number of domain controllers equal to the number of desired domain controllers specified by the customer 102. For instance, the auto-scaling group evaluates the different subnets and data zones of the PN to determine a balancing schema that would result in the number of desired domain controllers being distributed as evenly as possible among the subnets and data zones of the PN to prevent correlated failures. The managed directory service 104 may update the state of the domain controllers that are to be terminated to a "deleting" state in the directory database.

In an embodiment, the managed directory service 104 updates the entries corresponding to the domain controllers that are to be terminated in the directory database to disable monitoring of these domain controllers. Further, the managed directory service 104 deletes the network interfaces in the customer's account associated with the domain controllers that are to be terminated. In addition to deleting the network interfaces in the customer's account, the managed directory service 104 deletes the IP addresses in the managed directory service account associated with the domain controllers that are being terminated. The managed directory service 104 removes the entries corresponding to these domain controllers from the directory database and deletes any resources associated with these domain controllers. Thus, the unnecessary domain controllers are removed from the PN and resources associated with these domain controllers are made available for use by the managed directory service 104 for other purposes.

In an embodiment, if the managed directory service 104 determines that the number of desired domain controllers specified by the customer in its request is less than a minimum threshold for a number of domain controllers for the PN, the managed directory service 104 rejects the customer's request. The managed directory service 104, thus, ensures adequate redundancy and availability of the domain controllers of the PN by preventing the number of domain controllers from being less than a prescribed minimum threshold.

Figure 2:
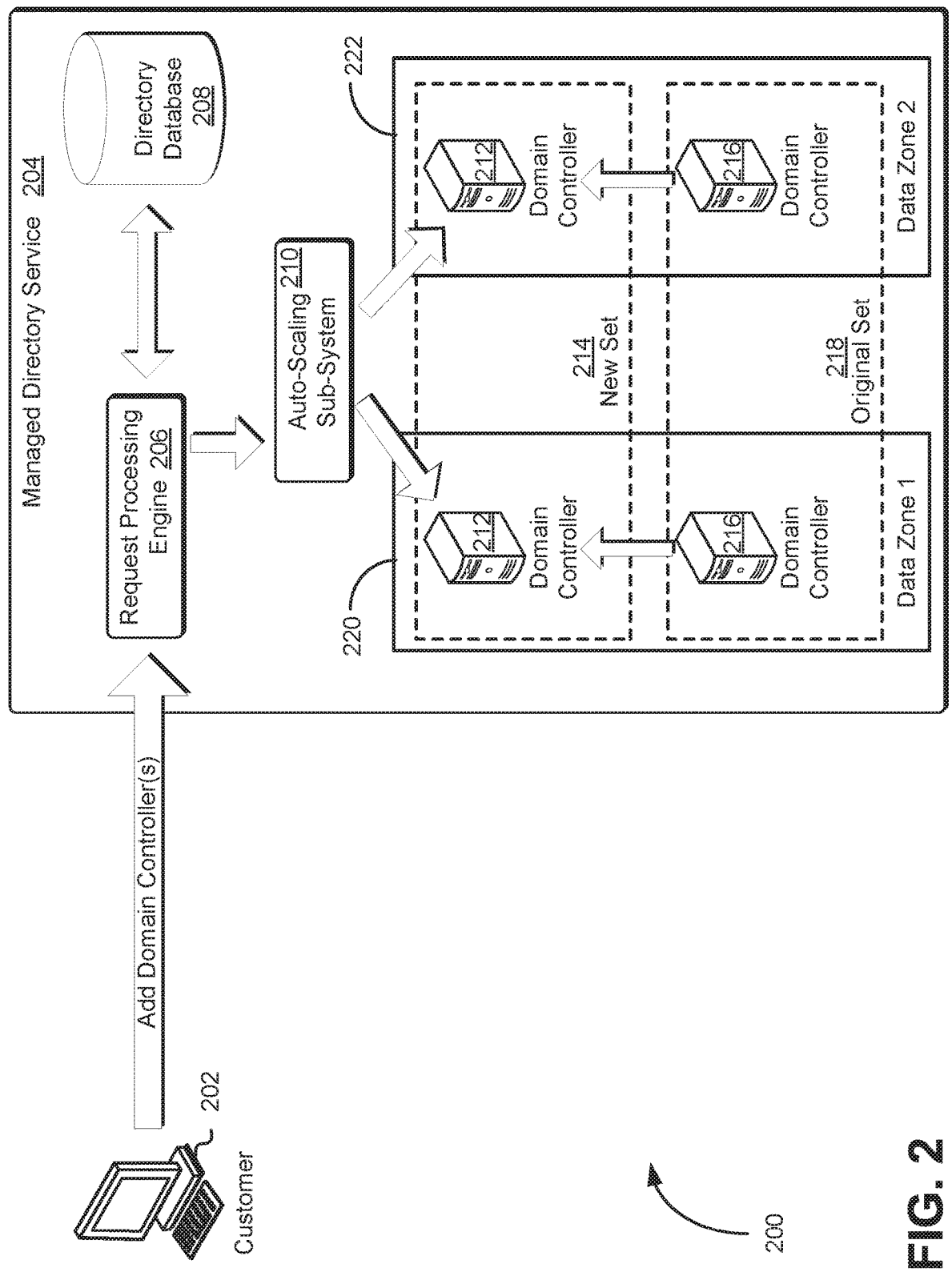
FIG. 2 shows an illustrative example of a system in which a managed directory service creates a new set of domain controllers for a directory in response to a request in accordance with at least one embodiment.

FIG. 2 shows an illustrative example of a system 200 in which a managed directory service 204 creates a new set of domain controllers 214 for a directory in response to a request in accordance with at least one embodiment. In the system 200, a customer 202 of the managed directory service 204 submits a request to a request processing engine 206 to provision one or more domain controllers 212 for its directory (e.g., PN). The request processing engine 206 is implemented on a computer system or abstraction thereof (such as one or more virtual machines operating via a hypervisor), implemented using hardware and software, and can comprise one or more processors and memory that stores executable instructions whose execution by the one or more processors causes the computer system to perform operations described herein. In an embodiment, the request specifies a number corresponding to the desired number of domain controllers that the customer 202 wishes to maintain for its directory. In response to the request, the request processing engine 206 accesses a directory database 208 to identify the customer's directory and the corresponding PN. Entries corresponding to the PN in the directory database 208 may specify the number of domain controllers in use within the directory, as well as the subnets and data zones 220, 222 in which these subnets are implemented.

In an embodiment, if the number of desired domain controllers specified by the customer 202 is greater than the number of domain controllers in use within the directory, the request processing engine 206 transmits a request to an auto-scaling sub-system 210 to initiate provisioning of a new set 214 of domain controllers 212 to supplement an original set 218 of domain controllers 216 of the PN. The auto-scaling sub-system 210 is implemented on a computer system or abstraction thereof (such as one or more virtual machines operating via a hypervisor), implemented using hardware and software, and can comprise one or more processors and memory that stores executable instructions whose execution by the one or more processors causes the computer system to perform operations described herein. In response to the request, the auto-scaling sub-system 210 updates the directory's internal state to "scaling" and updates the desired number of domain controllers in the directory database 208 to the number specified by the customer 202 in its request.

In an embodiment, the auto-scaling sub-system 210 adds entries in the directory database 208 corresponding to the new domain controllers 212 of the new set 214 of domain controllers that are to be created in response to the customer's request. The auto-scaling sub-system 210 updates the state of these domain controllers 212 via their corresponding entries in the directory database 208 to a "creating" state. In an embodiment, the auto-scaling sub-system 210 also creates a new auto-scaling group in the managed directory service account for the customer's directory if the desired number of domain controllers exceeds the number of original domain controllers 216 and the original domain controllers 216 of the original set 218 are the only ones implemented for the PN. However, if the auto-scaling sub-system 210 determines that the desired number of domain controllers exceeds a previously defined number of domain controllers for the PN, and the PN includes domain controllers in excess to the original domain controllers 216 provided by default upon creation of the directory and PN, an auto-scaling group may currently be in place for the additional domain controllers, which obviates the need for the auto-scaling sub-system 210 to create a new auto-scaling group. If, in this situation, the auto-scaling group for these additional domain controllers is not present, the auto-scaling sub-system 210 creates the auto-scaling group and adds the previously provisioned additional domain controllers to the auto-scaling group.

In an embodiment, the auto-scaling sub-system 210 sets the desired capacity of the auto-scaling group to the desired number of domain controllers minus the number of original domain controllers 216 of the original set 218 of domain controllers. Further, the auto-scaling sub-system 210 creates one or more network interfaces in the appropriate subnets in the customer's account. The auto-scaling sub-system 210 determines how many network interfaces to create in each subnet based on how the auto-scaling group balances the virtual machine instances for the additional domain controllers across the subnets. In an embodiment, the subnets are each implemented in different data zones 220, 222 to provide redundancy and enhanced availability of the PN, thus reducing the probability of a correlated failure.

In an embodiment, the auto-scaling sub-system 210 accesses the customer's managed directory service account to create an IP address for each new domain controller 212 that is to be provisioned in response to the customer's request. The IP addresses for the new domain controllers 212 are selected from a range of IP addresses assigned to the PN upon provisioning of the directory for the customer. In an embodiment, the auto-scaling sub-system 210, through the auto-scaling group, also provisions additional resources (e.g., block-level data storage devices, etc.) for the new domain controllers 212 of the new set 214. In an embodiment, the auto-scaling group determines, based on the location of existing domain controllers within the data zones 220, 222 of the PN, a balancing schema for provisioning the additional resources among the data zones 220, 222. For example, the balancing schema may indicate that each data zone 220, 222 is to have a set number of the domain controllers of the PN. Thus, the auto-scaling group allocates the additional resources such that each data zone 220, 222 is configured to sustain an apportioned set number of domain controllers of the PN in accordance with the balancing schema.

In an embodiment, the auto-scaling sub-system 210 initiates monitoring of the new domain controllers 212, such that in the event of a failure or other event that impacts performance of a new domain controller, the failure or other event may be detected by the managed directory service 204. In an embodiment, the auto-scaling sub-system 210 updates entries corresponding to the new domain controllers 212 in the directory database 208 to specify the network information for each new domain controller 212 of the new set 214. As noted above, an entry for a particular domain controller may specify the subnet and data zone the domain controller is located in, an identifier corresponding to the customer's PN, an identifier corresponding to the customer's directory, the network interface associated with the domain controller, the IP address of the domain controller, and the like.

In an embodiment, the auto-scaling sub-system 210 transmits a request to the original domain controllers 216 of the original set 218 to replicate their data on to the new domain controllers 212 of the PN within their respective data zones 220, 222. For example, an original domain controller 216 in data zone 220 will replicate its data on to the new domain controller 212 in data zone 220. This enables the new domain controllers 212 to perform network authentication functions in a manner as that of the original domain controllers 216 of the PN. The auto-scaling sub-system 210 activates the new domain controllers 212, which may now process incoming network traffic and authenticate users attempting to access the PN to utilize resources within the customer's directory. It should be noted that while the system 200 includes two data zones, data zone 220 and data zone 222, the customer's PN may be distributed among a greater number of data zones as needed to ensure an appropriate level of redundancy and availability.

In an embodiment, the auto-scaling sub-system 210 monitors the new domain controllers 212 of the new set 214 and the original domain controllers 216 of the original set 218 to identify any issues impacting performance of these domain controllers as they occur. For example, auto-scaling sub-system 210 obtains, through the auto-scaling groups for the new domain controllers 212 and for the original domain controllers 216, metrics corresponding to the performance of each of these domain controllers of the PN. Based on these metrics, the auto-scaling sub-system 210 determines whether there is an issue impacting performance of one or more domain controllers. If an issue is detected, whether it is with a specific domain controller, a subnet of the PN, or a particular data zone 220, 222, the auto-scaling sub-system 210 identifies the one or more domain controllers of the PN that are impacted by the issue. Further, the auto-scaling sub-system 210 performs one or more mitigating actions to resolve the identified issue.

Figure 3:
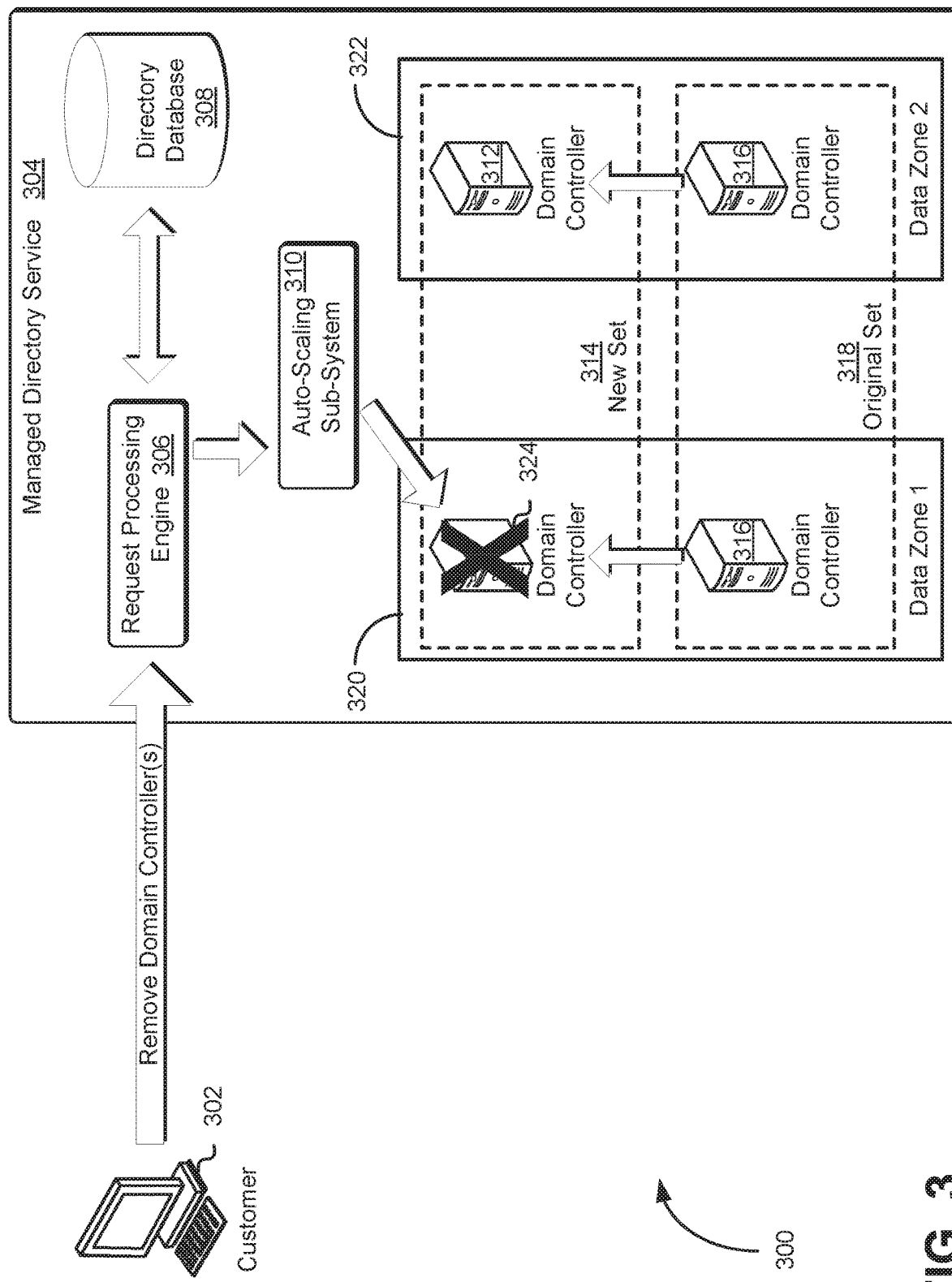
FIG. 3 shows an illustrative example of a system in which a managed directory service removes a domain controller from a fleet of domain controllers for a directory in response to a request in accordance with at least one embodiment.

FIG. 3 shows an illustrative example of a system 300 in which a managed directory service 304 removes a domain controller 324 from a fleet of domain controllers for a directory in response to a request in accordance with at least one embodiment. In the system 300, a customer 302 of the managed directory service 304 transmits a request to define a new number of desired domain controllers for its directory (e.g., PN). Through the request, the customer 302 can define a new number of desired domain controllers that is less than the number of domain controllers of the customer's PN fleet. This can serve as an indication that the customer 302 wishes to reduce the number of active domain controllers for its PN. For example, the customer 302 may define a lower number of desired domain controllers if there is a significant lull in network traffic and/or the customer 302 wishes to reduce the cost of maintaining its PN.

In an embodiment, the request processing engine 306 receives the request from the customer 302 and evaluates the request to obtain information usable to authenticate the customer 302. Further, the request processing engine 306 obtains one or more access control policies applicable to the customer 302 and to the request itself to determine whether the customer 302 is authorized to define a new number of desired domain controllers for the corresponding PN. If the customer 302 cannot be authenticated or the customer 302 is not authorized to change the number of desired domain controllers for the PN, the request processing engine 306 rejects the customer's request. The request processing engine 306, in an embodiment, is the same request processing engine 206 described above in connection with FIG. 2.

In an embodiment, if the customer 302 is authenticated and it is determined that the customer 302 is authorized to change the number of desired domain controllers for its PN and directory, the request processing engine 306 provides one or more parameters of the request to the auto-scaling sub-system 310. These one or more parameters can include the number, specified by the customer 302, of desired domain controllers for the PN. Further, the one or more parameters can include identifying information for the PN, including, but not limited to, an identifier of the PN, identifiers corresponding to the data zones 320, 322 in which the PN is located, identifiers corresponding to the domain controllers that are active in the PN, and the like. This additional information, in an embodiment, is obtained from the directory database 308, which can include one or more entries corresponding to the PN identified via the customer's request. The auto-scaling sub-system 310, in an embodiment, is the same auto-scaling sub-system 210 described above in connection with FIG. 2. Further, the directory database 308 is similar to the directory database 208 described above, where marked differences between these databases being defined via the entries stored therein, as these entries may be modified, added, or deleted over time.

In an embodiment, the auto-scaling sub-system 310 determines, based on the number of desired domain controllers specified by the customer 302, whether this number is equal to the number of default domain controllers of the PN (e.g., the original domain controllers 316 of the original set 318, which are provisioned at the time that the directory and PN are created). If the number of desired domain controllers is equal to the number of default domain controllers of the PN, the auto-scaling sub-system 310 removes the auto-scaling group for any additional domain controllers of the PN, as there are to be no domain controllers in addition to the original domain controllers 316 of the original set 318.

In an embodiment, if the number of desired domain controllers is less than the number of default domain controllers of the PN, the auto-scaling sub-system 310 returns a response to the request processing engine 306 indicating that the provided number of desired domain controllers is invalid. This may cause the request processing engine 306 to deny the customer's request or to elicit a response from the customer 302 that includes an acceptable number of desired domain controllers. This new number of desired domain controllers is provided to the auto-scaling sub-system 310. In an embodiment, if the number of desired domain controllers is less than the number of default domain controllers of the PN, the auto-scaling sub-system 310, the auto-scaling sub-system 310 sets the number of desired domain controllers as the number of default domain controllers of the PN and removes the auto-scaling group for any additional domain controllers of the PN. The auto-scaling sub-system 310 updates the directory database 308 to specify the new desired number of domain controllers in an entry corresponding to the directory and PN.

In an embodiment, the auto-scaling sub-system 310 causes the auto-scaling group of the PN that maintains the additional domain controllers of the PN (e.g., domain controllers 312, 324 of the new set 314, as illustrated in FIG. 3) to terminate any virtual machine instances of the domain controllers that are to be terminated in response to the customer's request. For example, the auto-scaling sub-system 310 causes the auto-scaling group to terminate virtual machine instances of a number of additional domain controllers, where this number is equal to the difference between the number of domain controllers of the PN and the number of desired domain controllers specified by the customer 302. As an illustrative example, and as illustrated in FIG. 3, if the number of desired domain controllers is equal to three and the number of domain controllers of the PN is equal to four, the auto-scaling sub-system 310 causes the auto-scaling group for the new set 314 of domain controllers to terminate the virtual machine instance of a domain controller of the new set 314, e.g., domain controller 324. In an embodiment, any superfluous domain controllers are selected from the new set 314 of domain controllers for termination, as the default domain controllers 316 of the original set 318 are to be maintained for the PN to preserve an original state of the directory.

In an embodiment, the auto-scaling sub-system 310 determines which domain controllers are going to be deleted based on which virtual machine instances the auto-scaling group has terminated. Based on this determination, the auto-scaling sub-system 310 updates the directory database 308 to change the state of the selected domain controllers to "deleting" in a domain controllers table for the PN. Further, in an embodiment, the auto-scaling sub-system 310 deletes any monitoring alarms in the customer's managed directory service account associated with the domain controllers that are going to be terminated. This prevents the managed directory service 304 from obtaining metrics corresponding to performance of the selected domain controllers. Further, as the selected domain controllers are terminated, the managed directory service 304 will not receive any notifications regarding the unavailability of the selected domain controllers.

In an embodiment, the auto-scaling sub-system 310 access the customer's account associated with the PN and directory to delete any of the network interfaces associated with the domain controllers selected for termination by the auto-scaling group. Further, the auto-scaling sub-system 310 deletes, from the customer's managed directory service account, the IP addresses previously assigned to the selected domain controllers that are to be terminated. This makes available the network interfaces and the IP addresses for other resources, including domain controllers that may be added to the PN in the future.

In an embodiment, the auto-scaling sub-system 310, through the auto-scaling group, terminates any other resources associated with the domain controllers that are being terminated. This can include any block-level data storage devices, object-based data storage devices, physical hardware used to implement the domain controllers, software used to implement the domain controllers, and any other components that may be utilized in conjunction with the virtual machine instances of these domain controllers. Terminating these additional resources results in the termination of the selected domain controllers, such as domain controller 324. In an embodiment, the auto-scaling sub-system 310 also removes any entries associated with the terminated domain controllers from the domain controllers table of the directory database 308. Further, the auto-scaling sub-system 310 adds entries to a domain controllers archive table of the directory database 308 to make available metrics associated with these terminated domain controllers to the customer 302 should the customer 302 wish to review performance of its PN with additional domain controllers. The auto-scaling sub-system 310 updates the state of the directory and PN to indicate that the directory is again available for use.

Figure 4:
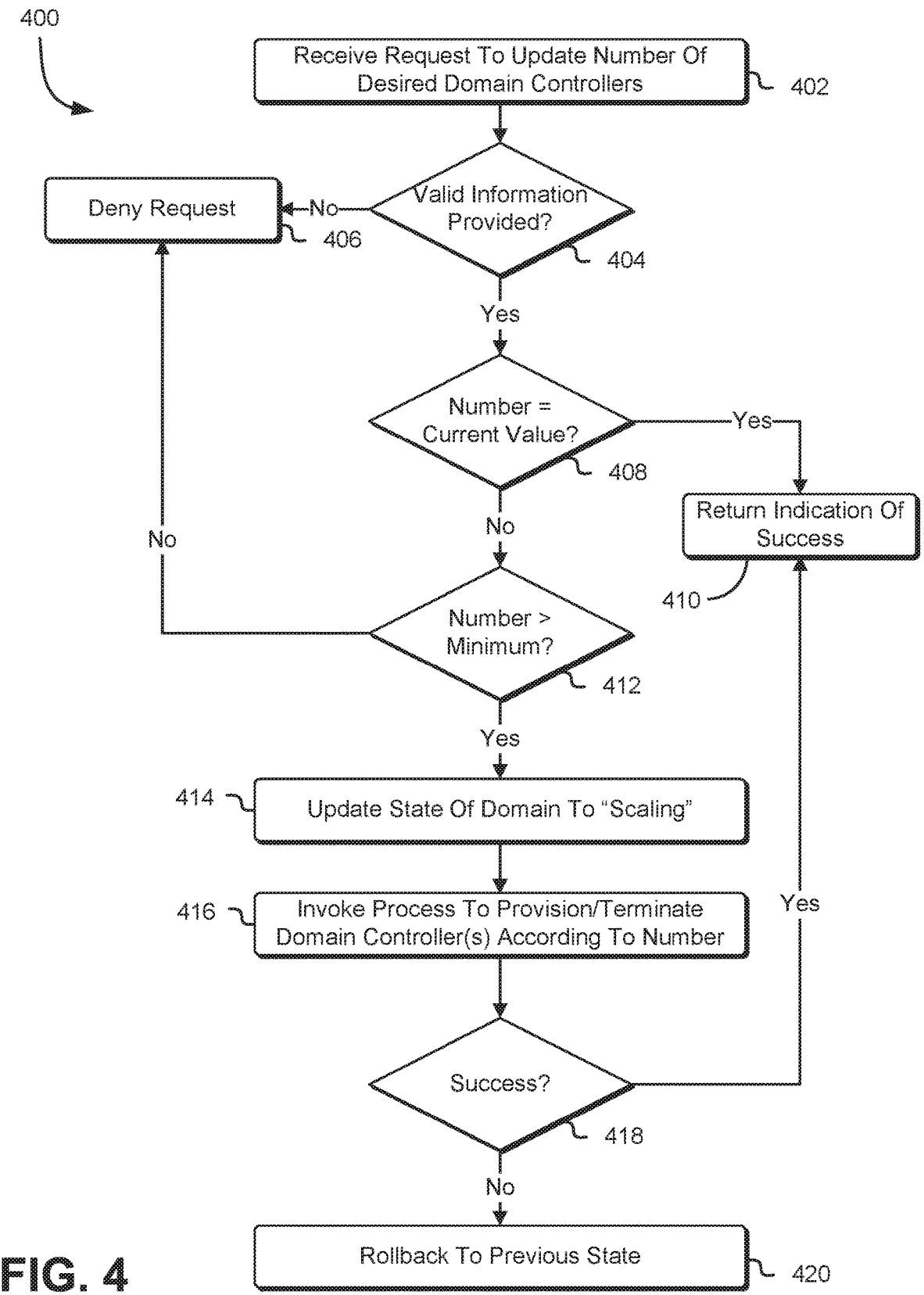
FIG. 4 shows an illustrative example of a process for updating the number of desired domain controllers for a directory in accordance with at least one embodiment.

FIG. 4 shows an illustrative example of a process 400 for updating the number of desired domain controllers for a directory in accordance with at least one embodiment. Operations of the process 400 are performed by the request processing engine and the auto-scaling sub-system of the managed directory service. The process 400 can also be performed by a computer system or abstraction thereof (such as one or more virtual machines operating via a hypervisor), implemented using hardware and software, and can comprise one or more processors and memory that stores executable instructions whose execution by the one or more processors causes the computer system to perform the operations of the request processing engine and the auto-scaling sub-system.

In an embodiment, the request processing engine receives 402 a request to update the number of desired domain controllers for a particular directory. In an embodiment, the managed directory service enables its customer to submit the request through one or more API calls to the service (e.g., "UpdateDesiredNumberofDomainControllers( )" etc.). The request can specify an identifier corresponding to the customer submitting the request, as well as an identifier corresponding to the directory of the customer (which may be referred to as a DirectoryID). Further, the request can specify a directory type corresponding to the customer's directory (e.g., Microsoft® Active Directory®, etc.). In an embodiment, the request processing engine determines, in response to the request, whether the customer can be authenticated and, if so, whether the customer is authorized to define a new number of desired domain controllers for the directory. For instance, the request can specify credential information of the customer, which the request processing engine may evaluate to determine whether authentication of the customer is possible. In an embodiment, the request from the customer is digitally signed using a cryptographic key. The request processing engine verifies the digital signature using its cryptographic key in order to authenticate the customer.

In an embodiment, if the customer is authenticated and is authorized to define a new number of desired domain controllers for the specified directory, the request processing engine determines 404 whether the customer has provided valid information for defining the new number of desired domain controllers for its directory. As noted above, this information includes an identifier corresponding to the customer, an identifier corresponding to the directory, and a directory type of the directory. The request processing engine evaluates this information to determine whether there is a directory corresponding to the provided directory identifier and, if so, whether it is of the type indicated and whether it is associated with the customer. In an embodiment, if any of this information is invalid, the customer cannot be authenticated, or the customer is not authorized to change the number of desired domain controllers for the directory, the request processing engine denies 406 the customer's request.

In an embodiment, if the request processing engine determines that the customer has provided valid information, the request processing engine determines 408 whether the specified number of desired domain controllers is equal to the current number of desired domain controllers for the directory. In an embodiment, the request processing engine accesses the directory database to identify an entry corresponding to the directory identified in the request. This entry may specify the current number of desired domain controllers of the directory. If the new number of desired domain controllers specified by the customer in its request is equal to the current number of desired domain controllers specified in the directory database, the request processing engine returns 410 an indication of success. This indication of success, in an embodiment, is a notification to the customer indicating that the request has been fulfilled.

In an embodiment, if the new number of desired domain controllers is not equal to the current number of desired domain controllers specified in the directory database, the request processing engine determines 412 whether this new number is greater than a minimum threshold value for the number of domain controllers that are active for the directory at any given time. In an embodiment, if the request processing engine determines 412 that the number of desired domain controllers specified by the customer in its request is less than a minimum threshold value for a number of domain controllers for the directory, the request processing engine denies 406 the customer's request. This ensures adequate redundancy and availability of the domain controllers of the directory by preventing the number of domain controllers from being less than a prescribed minimum threshold.

In an embodiment, if the new number of desired domain controllers is greater than the minimum threshold value, the request processing engine updates 414 the internal state of the domain to a "scaling" state, indicating that domain controllers are either being added to or removed from the directory. This state information is indicated in the entry for the directory in the directory database. Further, the request processing engine updates the desired number of domain controllers in the directory database to the number specified by the customer in its request. In an embodiment, the request processing engine evaluates the entry in the directory database corresponding to the directory to determine whether the state of the directory is set to "Ready" or "Not Set." If the state of the directory is set to "Not Set," the request processing engine may wait until the state of the directory is changed to "Ready" or may indicate to the customer that the request cannot be fulfilled. However, if the state of the directory is set to "Ready," the request processing engine may change this state to "scaling," as described above.

In an embodiment, based on the new number of desired domain controllers specified by the customer, the request processing engine causes the auto-scaling sub-system to invoke 416 a process to either provision additional domain controllers for the directory or terminate any superfluous domain controllers from the directory in accordance with the specified new number. The process for provisioning additional domain controllers based on the new number of desired domain controllers for the directory is described in greater detail below in connection with FIG. 5. The process for terminating any superfluous domain controllers from the directory in accordance with the specified new number of domain controllers for the directory is described in greater detail below in connection with FIG. 7. The request processing engine monitors performance of either process to determine 418 whether the process was performed successfully by the auto-scaling sub-system.

In an embodiment, if the request processing engine determines that the invoked process was not completed successfully, the request processing engine performs 420 a rollback of the directory to its previous state (e.g., "Ready" state from a "Scaling" state). Further, the request processing engine may cause the auto-scaling sub-system to reinstate any terminated domain controllers or terminate any added domain controllers from the directory. In an embodiment, if the invoked process was completed successfully, the request processing engine returns 410 an indication of success and sets the state of the directory back to "Ready."

Figure 5:
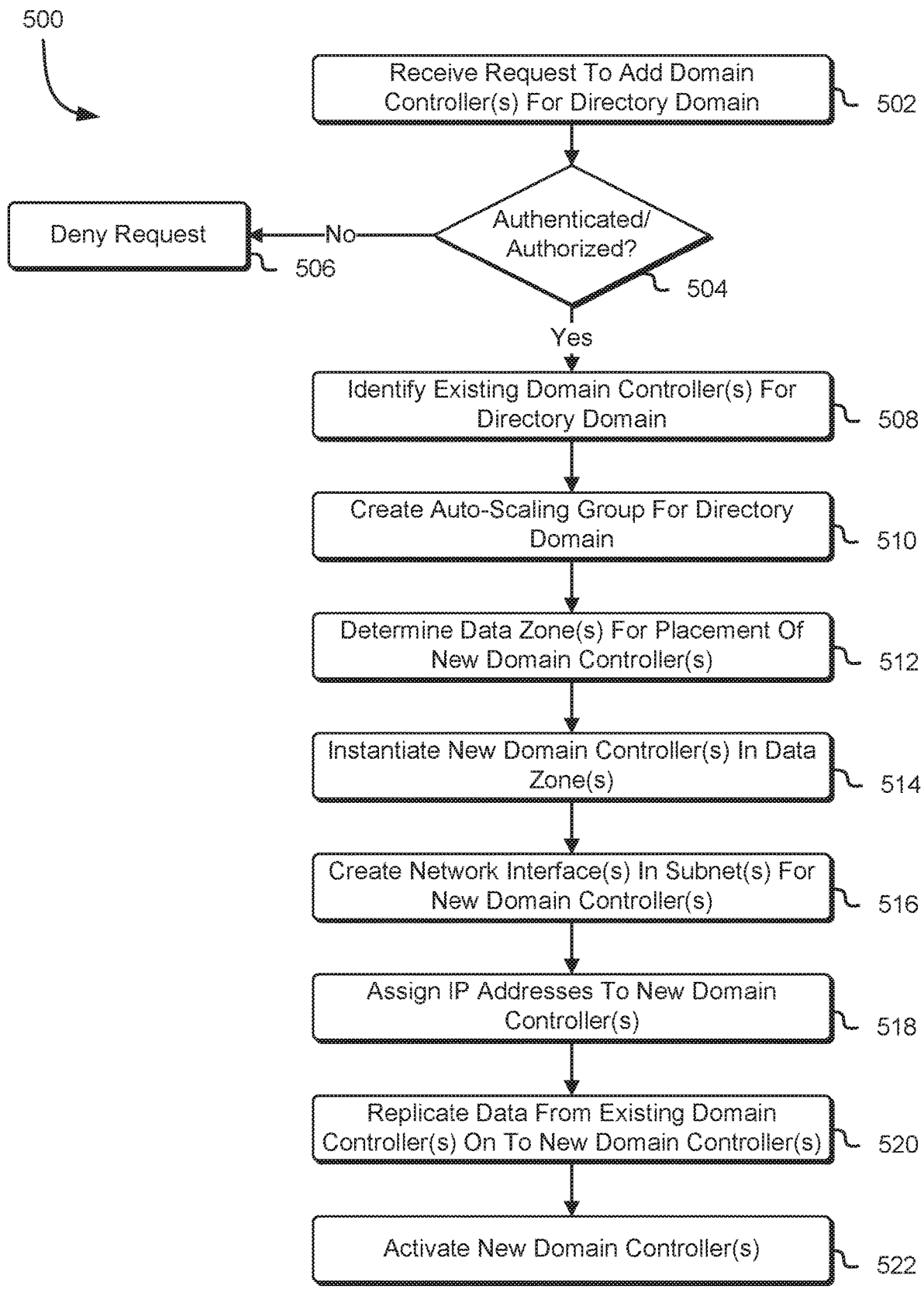
FIG. 5 shows an illustrative example of a process for creating new domain controllers for a directory in response to a request to have a particular number of domain controllers available for the directory in accordance with at least one embodiment.

FIG. 5 shows an illustrative example of a process 500 for creating new domain controllers for a directory in response to a request to have a particular number of domain controllers available for the directory in accordance with at least one embodiment. Operations of the process 500 are performed by the request processing engine and the auto-scaling sub-system of the managed directory service. The process 500 can also be performed by a computer system or abstraction thereof (such as one or more virtual machines operating via a hypervisor), implemented using hardware and software, and can comprise one or more processors and memory that stores executable instructions whose execution by the one or more processors causes the computer system to perform the operations of the request processing engine and the auto-scaling sub-system.

In an embodiment, the request processing engine of the managed directory service receives 502 a request from a customer or other entity to add one or more domain controllers to its directory and PN. In an embodiment, the request specifies a number of desired domain controllers for the customer's directory and PN. This number can be greater than the number of active domain controllers of the directory in operation. If the number of desired domain controllers is greater than the number of active domain controllers of the directory, the request processing engine determines that the customer or other entity is requesting addition of domain controllers to its directory. However, if the number of desired domain controllers specified in the request is equal to the number of active domain controllers of the directory, the request processing engine returns a response indicating that the request has been processed and that the domain controllers are currently implemented in accordance with the number of desired domain controllers specified in the request.

In an embodiment, the request processing engine determines 504, in response to the request, whether the customer can be authenticated and, if so, whether the customer is authorized to define a new number of desired domain controllers for the directory. For instance, the request can specify credential information of the customer, which the request processing engine may evaluate to determine whether authentication of the customer is possible. In an embodiment, the request from the customer is digitally signed using a cryptographic key. The request processing engine verifies the digital signature using its cryptographic key in order to authenticate the customer. In an embodiment, if the request processing engine determines that the customer cannot be authenticated and/or that the customer is not authorized to change the number of desired domain controllers for the specified directory, the request processing engine denies 506 the request.

In an embodiment, if the customer has been authenticated and it is determined that the customer is authorized to define a new number of desired domain controllers for the directory, the request processing engine passes the request to an auto-scaling sub-system for fulfillment of the request. The auto-scaling sub-system identifies 508 the existing domain controllers for the directory and determines the number of additional domain controllers that are to be added to the directory. For instance, the auto-scaling sub-system accesses a directory database and identifies one or more entries corresponding to the directory. These entries may specify information regarding the active domain controllers of the directory, as well as the previous number of desired domain controllers for the directory. The auto-scaling sub-system utilizes the previously defined number of desired domain controllers from the directory database and the number of desired domain controllers specified in the request to identify the number of domain controllers that are to be added to the directory.

In an embodiment, the auto-scaling sub-system creates 510 an auto-scaling group for the directory for the addition of new domain controllers to the directory. The capacity of the new auto-scaling group is set to the desired number of domain controllers for the directory minus the number of domain controllers currently operating within the directory. In an embodiment, the auto-scaling sub-system, through the newly created auto-scaling group, determines 512 which data zones are to be used for placement of the new domain controllers. For instance, the auto-scaling group evaluates placement of the previously provisioned domain controllers of the directory to determine a balancing schema for placement of the new domain controllers. The balancing schema, in an embodiment, can indicate that the domain controllers of the directory are to be instantiated on different data zones of the directory evenly in order to prevent correlated failures. Alternatively, the balancing schema can indicate a preference for placement of domain controllers within a particular data zone over another. For instance, if a particular data zone is prone to greater network traffic, the balancing schema can specify placement of more domain controllers within this particular data zone in order to support this greater traffic. Alternatively, the balancing schema can specify placement of new domain controllers within another data zone in order to balance network traffic among the various data zones of the directory.

In an embodiment, based on the balancing schema generated by the auto-scaling group, the auto-scaling sub-system instantiates 514 the new domain controllers within the various data zones of the directory in accordance with the balancing schema. The auto-scaling sub-system provisions one or more virtual machine instances, servers, or other components for each new domain controller within the various data zones. The auto-scaling sub-system further creates 516 a network interface in the corresponding subnets of the directory for each new domain controller. The network interface can include one or more IP addresses from a range of IP addresses of the directory. The auto-scaling sub-system determines how many network interfaces are to be created in each subnet based on a balancing of the resources usable to instantiate the new domain controllers.

In an embodiment, the auto-scaling sub-system assigns 518, to each new domain controller 108, an IP address and creates additional resources within the identified data zones for the new domain controllers. These additional resources can include data storage devices (logical and/or physical) usable to store data related to the directory of the directory. Further, the auto-scaling sub-system initiates monitoring of the new domain controllers, such that in the event of a failure or other event that impacts performance of a new domain controller, the failure or other event may be detected by the managed directory service and resolved. In an embodiment, the auto-scaling sub-system updates entries corresponding to the new domain controllers in the directory database to specify the network information for each new domain controller. An entry for a particular domain controller may specify the subnet and data zone the domain controller is located in, an identifier corresponding to the customer's PN, an identifier corresponding to the customer's directory, the network interface associated with the domain controller, the IP address of the domain controller, and the like. In an embodiment, the auto-scaling sub-system causes the existing domain controllers to replicate 520 their data on to the new domain controllers of the directory. This enables the new domain controllers to perform network authentication functions in a manner as that of the original domain controllers 106 of the PN. The auto-scaling sub-system activates 522 the new domain controllers, which can now process incoming network traffic and authenticate users attempting to access the directory to utilize resources within the customer's directory.

Figure 6:
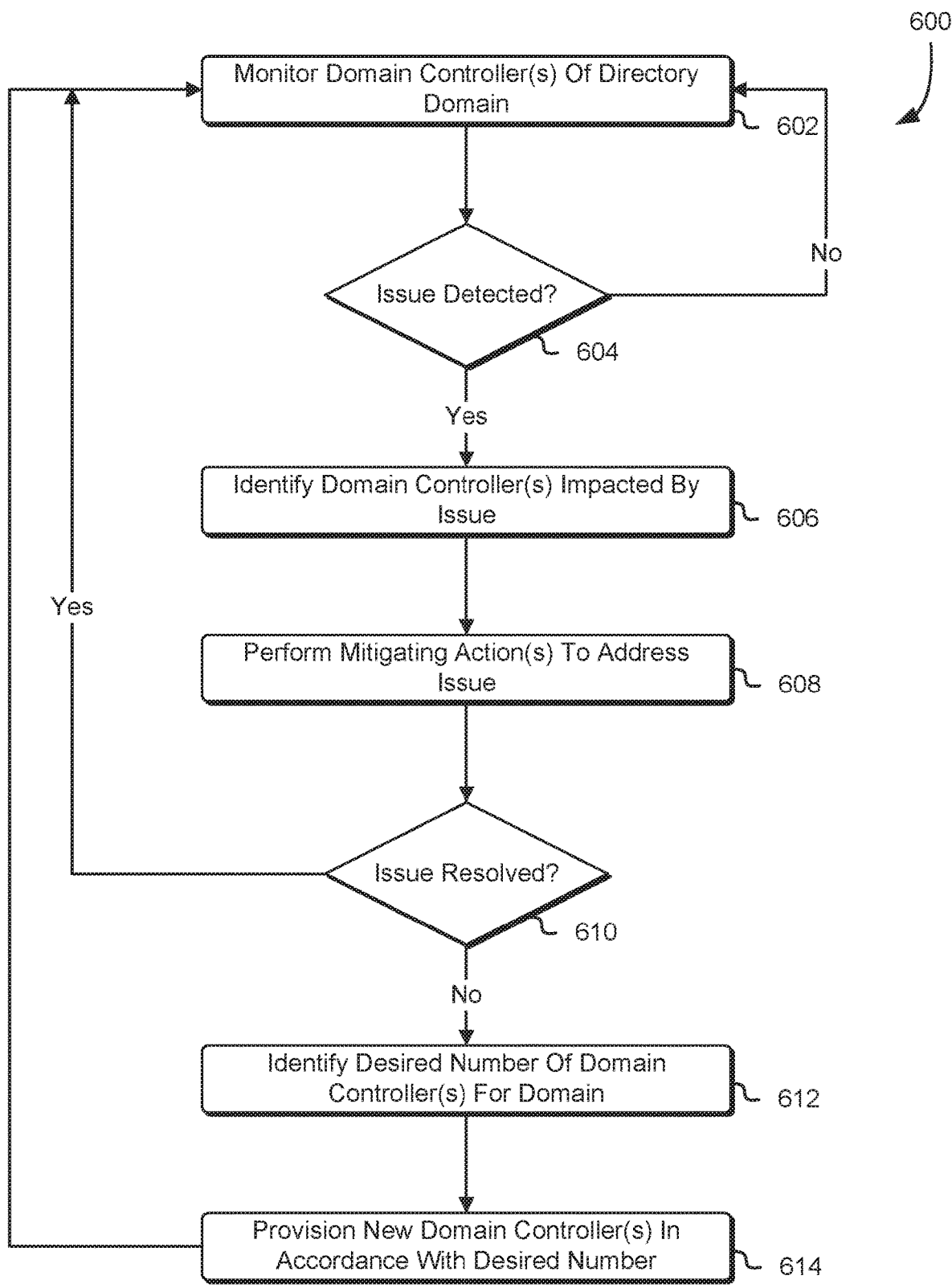
FIG. 6 shows an illustrative example of a process for monitoring domain controllers of a directory to ensure availability of domain controllers according to a customer preference in accordance with at least one embodiment.

FIG. 6 shows an illustrative example of a process 600 for monitoring domain controllers of a directory to ensure availability of domain controllers according to a customer preference in accordance with at least one embodiment. Operations of the process 600 are performed by the auto-scaling sub-system previously created for management of the various auto-scaling groups of the directory. The process 600 can also be performed by a computer system or abstraction thereof (such as one or more virtual machines operating via a hypervisor), implemented using hardware and software, and can comprise one or more processors and memory that stores executable instructions whose execution by the one or more processors causes the computer system to perform the operations of the auto-scaling sub-system.

In an embodiment, the auto-scaling sub-system monitors 602, through the various auto-scaling groups of the directory, the domain controllers of the directory. The auto-scaling sub-system, in an embodiment, obtains metrics from each of the domain controllers of the directory, as well as metrics from other resources of the various data zones where the directory is implemented. These metrics may specify performance attributes of the domain controllers, such as incoming and outgoing network traffic, authentication responses corresponding to access requests, and the like. Further, the metrics may specify performance attributes of the data zones, including incoming and outgoing network traffic information for the data zones. The auto-scaling sub-system, in an embodiment, also receives alerts from the computing resource service provider regarding any performance degradation or other events that may impact performance of the resources within a particular set of data zones. These metrics and other information from the computing resource service provider are used by the auto-scaling sub-system to determine 604 whether an issue with one or more domain controllers of the directory has been detected. For example, the auto-scaling sub-system detects an issue as a result of a domain controller being unavailable as a result of a particular data zone being unavailable, hardware that implements the domain controller being unavailable, software used to implement the domain controller being corrupted, the domain controller experiencing significant network traffic beyond its capacity, and the like.

In an embodiment, if the auto-scaling sub-system determines that there are no issues impacting performance of the various domain controllers of the directory, the auto-scaling sub-system continues to monitor 602 the domain controllers of the directory by obtaining new metrics for these domain controllers and the corresponding resources and data zones used to implement these domain controllers. However, if the auto-scaling sub-system detects an issue based on the received metrics and alerts, the auto-scaling sub-system identifies 606 the domain controllers impacted by the issue and performs 608 one or more mitigating actions to address the issue. For example, if the auto-scaling sub-system determines that a particular set of servers within a data zone are unavailable due to a particular issue with these servers or with the data zone itself, the auto-scaling sub-system determines, from the directory database, which domain controllers are implemented using this particular set of servers. Further, the auto-scaling sub-system may cause the particular set of servers to be reinitiated in order to determine whether the issue is resolved. In some instances, the auto-scaling sub-system may allow a period of time to elapse to determine whether the issue is resolved automatically without further intervention. Other operations can be performed to attempt addressing of the detected issue, short of provisioning new domain controllers if it is not required.

In an embodiment, the auto-scaling sub-system determines 610 whether the detected issue has been resolved. If the issue has been resolved, the auto-scaling sub-system resumes monitoring 602 of the domain controllers of the directory by evaluating metrics and other information corresponding to the domain controllers and to resources and data zones used to implement these domain controllers. However, if the auto-scaling sub-system is unable to resolve the issue or determines that the issue has not been resolved by the computing resource service provider or other entity, the auto-scaling sub-system identifies 612, from the directory database, the number of desired domain controllers for the directory, as specified by a customer in a previous request to implement a set of domain controllers for its directory.

In an embodiment, the auto-scaling sub-system determines, based on the identified number of desired domain controllers and the number of active domain controllers for the directory (e.g., domain controllers not impacted by the detected issue), how many domain controllers are to be provisioned to address the issue. For example, the auto-scaling sub-system subtracts the number of active domain controllers from the number of desired domain controllers to determine the number of domain controllers to be provisioned. Based on this determination, the auto-scaling sub-system provisions 614 one or more new domain controllers in accordance with the number of desired domain controllers for the directory. The provisioning of these domain controllers is performed in accordance with the operations described above in connection with the process 500, illustrated in FIG. 5.

Figure 7:
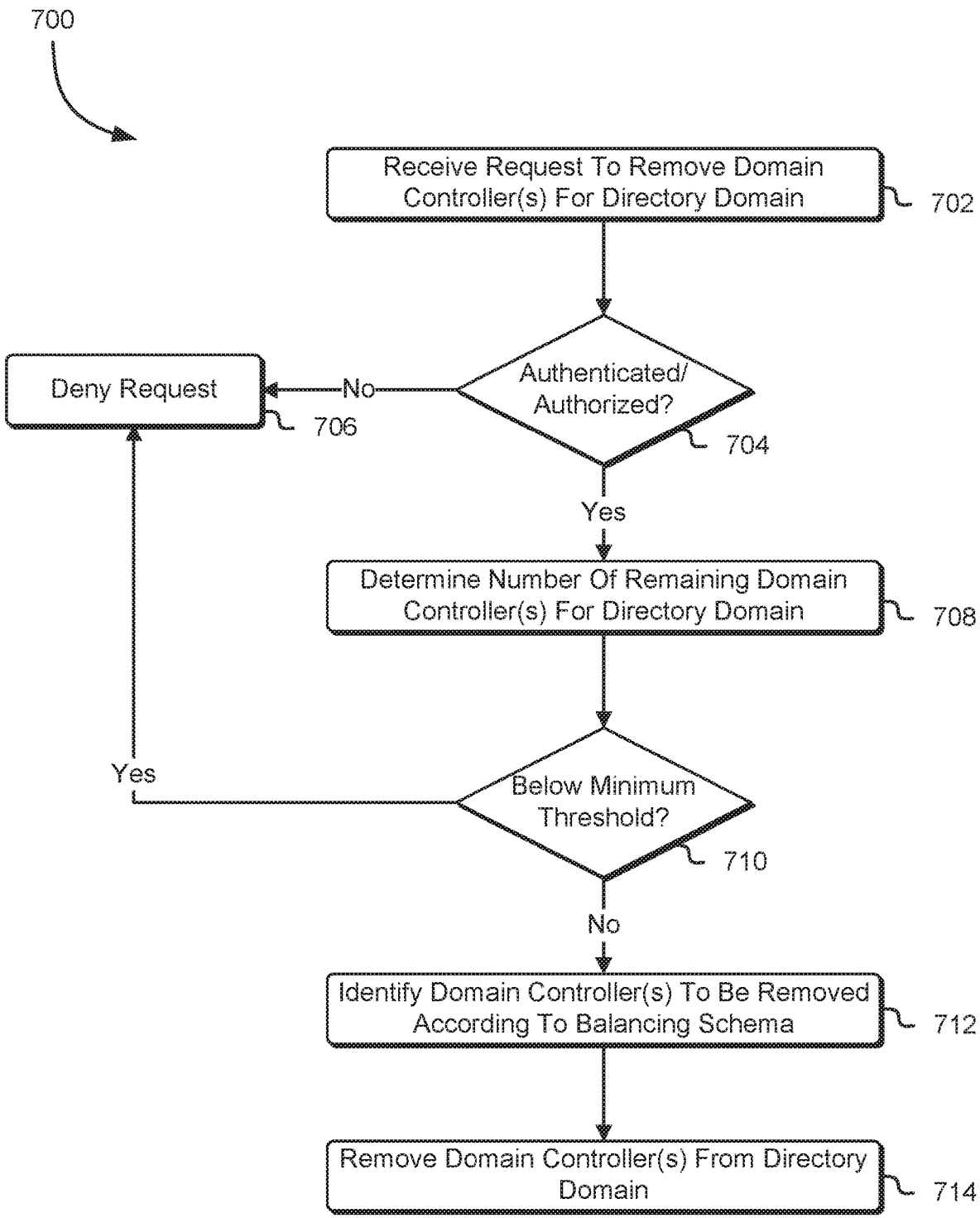
FIG. 7 shows an illustrative example of a process for removing a domain controller from a fleet of domain controllers in response to a request to reduce the number of domain controllers for a directory in accordance with at least one embodiment.

FIG. 7 shows an illustrative example of a process 700 for removing a domain controller from a fleet of domain controllers in response to a request to reduce the number of domain controllers for a directory in accordance with at least one embodiment. Operations of the process 700 are performed by the request processing engine and the auto-scaling sub-system of the managed directory service. The process 700 can also be performed by a computer system or abstraction thereof (such as one or more virtual machines operating via a hypervisor), implemented using hardware and software, and can comprise one or more processors and memory that stores executable instructions whose execution by the one or more processors causes the computer system to perform the operations of the request processing engine and the auto-scaling sub-system.

In an embodiment, the request processing engine of the managed directory service receives 702 a request from a customer or other entity to remove one or more domain controllers from its directory and PN. In an embodiment, the request specifies a number of desired domain controllers for the customer's directory and PN. This number can be less than the number of active domain controllers of the directory in operation. If the number of desired domain controllers is less than the number of active domain controllers of the directory, the request processing engine determines that the customer or other entity is requesting removal of domain controllers to its directory. However, if the number of desired domain controllers specified in the request is equal to the number of active domain controllers of the directory, the request processing engine returns a response indicating that the request has been processed and that the domain controllers are currently implemented in accordance with the number of desired domain controllers specified in the request.

In an embodiment, the request processing engine determines 704, in response to the request, whether the customer can be authenticated and, if so, whether the customer is authorized to define a new number of desired domain controllers for the directory. For instance, the request can specify credential information of the customer, which the request processing engine may evaluate to determine whether authentication of the customer is possible. In an embodiment, the request from the customer is digitally signed using a cryptographic key. The request processing engine verifies the digital signature using its cryptographic key in order to authenticate the customer. In an embodiment, if the request processing engine determines that the customer cannot be authenticated and/or that the customer is not authorized to change the number of desired domain controllers for the specified directory, the request processing engine denies 706 the request.

In an embodiment, the request processing engine causes the auto-scaling sub-system of to determine 708 the number of remaining domain controllers for the directory if the request from the customer is fulfilled. The auto-scaling sub-system, for example, evaluates the number of desired domain controllers for the directory to identify the remaining number of domain controllers for the directory if the request is fulfilled. Based on this identified number of remaining domain controllers for the directory, the auto-scaling sub-system determines 710 whether this number is below a minimum threshold of domain controllers for the directory. For example, the managed directory service maintains one or more policies whereby a directory is required to maintain a minimum number of domain controllers for the directory. This requirement may be imposed to maintain a minimum level of redundancy and availability for the directory in the event of an issue that impacts a particular data zone and/or domain controller. This minimum number of domain controllers, in an embodiment, corresponds to the number of original domain controllers provisioned for the directory. If the number of remaining domain controllers would fail to satisfy a minimum threshold for the directory, the auto-scaling sub-system transmits a notification to the request processing engine to indicate that the request is to be denied. In response to the notification, the request processing engine denies 706 the request to reduce the number of active domain controllers for the directory, as a number of default domain controllers are needed to support the directory.

In an embodiment, if the number of remaining domain controllers satisfies the minimum threshold requirement for the directory, the auto-scaling sub-system identifies 712 the one or more domain controllers that are to be removed from the directory in accordance with a balancing schema for placement of domain controllers of the directory. As noted above, the auto-scaling sub-system evaluates placement of previously provisioned domain controllers of the directory to determine a balancing schema for placement of new domain controllers as they are added to the directory. This balancing schema, in an embodiment, can indicate that the domain controllers of the directory are to be instantiated on different data zones of the directory evenly in order to prevent correlated failures. Alternatively, the balancing schema can indicate a preference for placement of domain controllers within a particular data zone over another. This previously determined balancing schema is used by the auto-scaling sub-system to identify which domain controllers can be removed while satisfying the requirements indicated by the balancing schema. For example, the balancing schema may indicate that each data zone is to maintain an equal number (or as close to equal if an odd number of domain controllers are implemented on an even number of data zones) of domain controllers for the directory.

In an embodiment, the auto-scaling sub-system removes 714, based on the balancing schema, the identified domain controllers from the directory. In an embodiment, the auto-scaling sub-system causes the auto-scaling group of the directory that maintains the additional domain controllers of the directory to terminate any virtual machine instances of the domain controllers that are to be terminated in response to the customer's request. Further, in an embodiment, the auto-scaling sub-system updates the directory database to change the state of the selected domain controllers to "deleting" in a domain controllers table for the directory. In an embodiment, the auto-scaling sub-system deletes any monitoring alarms in the customer's managed directory service account associated with the domain controllers that are going to be terminated.

In an embodiment, the auto-scaling sub-system accesses the customer's account associated with the directory to delete any of the network interfaces associated with the domain controllers selected for termination by the auto-scaling group. Further, the auto-scaling sub-system deletes, from the customer's managed directory service account, the IP addresses previously assigned to the selected domain controllers that are to be terminated. In an embodiment, the auto-scaling sub-system, through the auto-scaling group, terminates any other resources associated with the domain controllers that are being terminated. This can include any block-level data storage devices, object-based data storage devices, physical hardware used to implement the domain controllers, software used to implement the domain controllers, and any other components that may be utilized in conjunction with the virtual machine instances of these domain controllers. Terminating these additional resources results in the termination of the selected domain controllers and in the disassociation of the selected domain controllers from the directory of the customer. In an embodiment, the auto-scaling sub-system disassociates the selected domain controllers from the directory by removing any entries associated with the terminated domain controllers from the domain controllers table of the directory database. Further, the auto-scaling sub-system adds entries to a domain controllers archive table of the directory database to make available metrics associated with these terminated domain controllers to the customer. The auto-scaling sub-system updates the state of the directory to indicate that the directory is again available for use.

Figure 8:
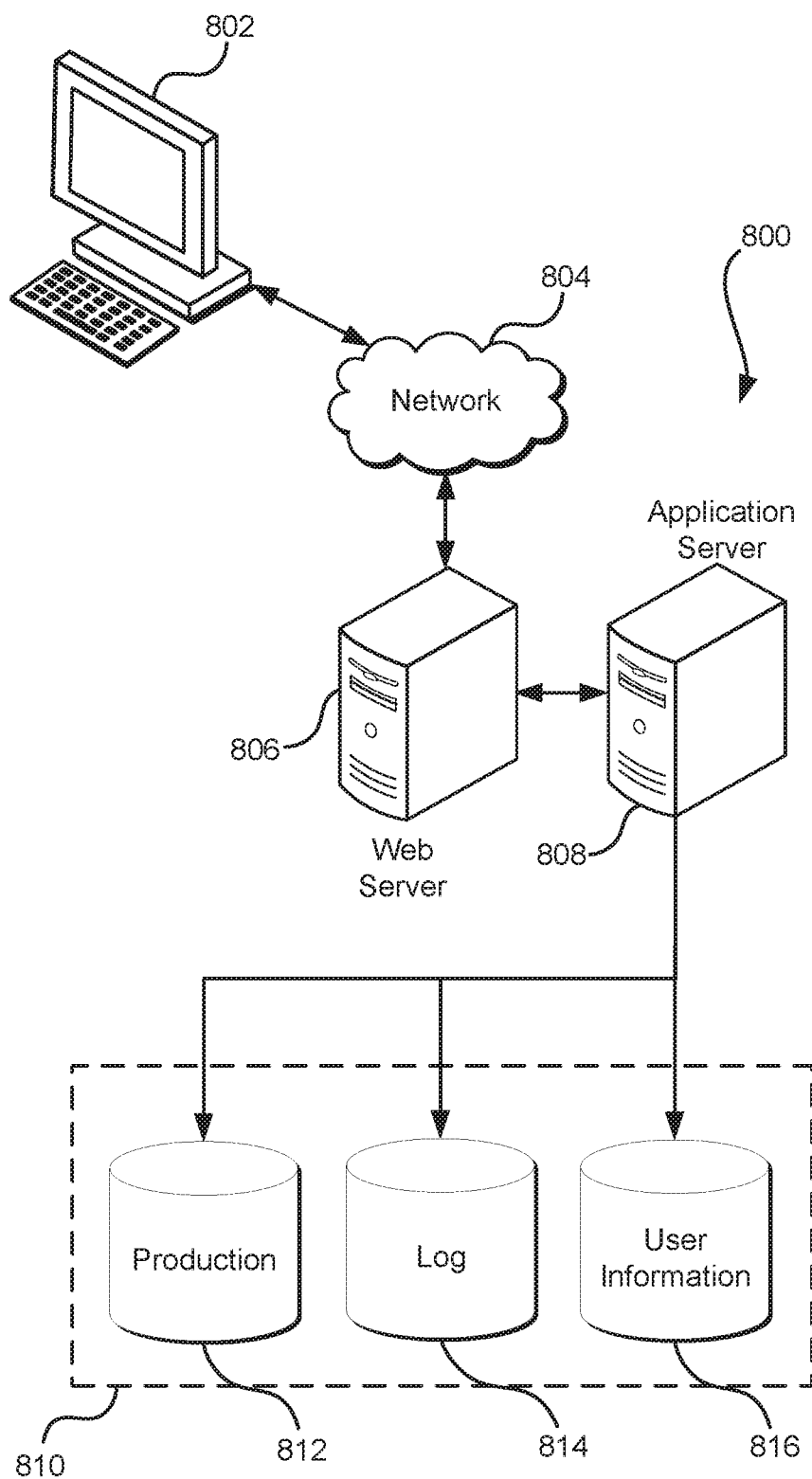
FIG. 8 shows an illustrative example of a system in which various embodiments can be implemented.

FIG. 8 illustrates aspects of an example system 800 for implementing aspects in accordance with an embodiment. As will be appreciated, although a web-based system is used for purposes of explanation, different systems may be used, as appropriate, to implement various embodiments. In an embodiment, the system includes an electronic client device 802, which includes any appropriate device operable to send and/or receive requests, messages, or information over an appropriate network 804 and convey information back to a user of the device. Examples of such client devices include personal computers, cellular or other mobile phones, hand-held messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly-addressable communications network, as the system includes a web server 806 for receiving requests and serving content in response thereto, although for other networks an alternative device serving a similar purpose could be used as would be apparent to one of ordinary skill in the art.

In an embodiment, the illustrative system includes at least one application server 808 and a data store 810 and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including, but not limited to, text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including, but not limited to, forms that are perceptible to the user audibly, visually and/or through other senses. The handling of all requests and responses, as well as the delivery of content between the client device 802 and the application server 808, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 810, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 812 and user information 816, which are used to serve content for the production side. The data store also is shown to include a mechanism for storing log data 814, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 810.

The data store 810, in an embodiment, is operable, through logic associated therewith, to receive instructions from the application server 808 and obtain, update or otherwise process data in response thereto and the application server 808 provides static, dynamic, or a combination of static and dynamic data in response to the received instructions. In an embodiment, dynamic data, such as data used in web logs (blogs), shopping applications, news services, and other such applications are generated by server-side structured languages as described herein or are provided by a content management system ("CMS") operating on, or under the control of, the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 802. Continuing with example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 800 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed (i.e., as a result of being executed) by a processor of the server, cause or otherwise allow the server to perform its intended functions.

The system 800, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols and such a system also includes a number of workstations running any of a variety of commercially-available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that run one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above which can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood with the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, a non-transitory computer-readable storage medium store instructions and a main CPU execute some of the instructions while a graphics processor unit executes other instructions. In an embodiment, different components of a computer system have separate processors and different processors execute different subsets of the instructions.

Accordingly, in an embodiment, computer systems are configured to implement one or more services that singly or collectively perform operations of processes described herein and such computer systems are configured with applicable hardware and/or software that enable the performance of the operations. Further, a computer system that implement an embodiment of the present disclosure is a single device and, in another embodiment, is a distributed computer systems comprising multiple devices that operate differently such that the distributed computer system performs the operations described herein and such that a single device does not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system, comprising:
   one or more memories to store one or more machine-readable instructions, which if performed by one or more processors, cause the system to:
   obtain a request to launch one or more domain controllers on behalf of one or more users of a web-based service;
   launch at least one of the one or more domain controllers in a first location based at least in part on a second location of one or more other domain controllers launched on behalf of the one or more users;
   connect the at least one of the one or more domain controllers to a private network associated with the one or more users;
   associate the at least one or more domain controllers with at least one directory associated with the one or more users; and
   cause the at least one of the one or more domain controllers to manage access to resources corresponding to the web-based service according to information stored in the at least one directory associated with the one or more users.

2. The system of claim 1, wherein the machine-readable instructions further cause the system to:
   obtain a second request to terminate a set of domain controllers associated with the at least one directory;
   determine, based at least in part on a second set of domain controllers implemented at the first location and the second location, the set of domain controllers;

disassociate the set of domain controllers from the at least one directory; and terminate the set of domain controllers.

3. The system of claim 1, wherein:

the request specifies a number of desired domain controllers; and the machine-readable instructions further cause the system to launch the one or more domain controllers in accordance with the number of desired domain controllers.

4. The system of claim 1, wherein the machine-readable instructions further cause the system to:

detect an issue with a domain controller associated with the at least one directory;

determine, based on locations of a set of domain controllers, whereby the set of domain controllers excludes the domain controller, a location for a new domain controller;

launch the new domain controller in the location; and associate the new domain controller with the at least one directory.

5. A computer-implemented method, comprising:

obtaining, by a web-based service, a request to create a domain controller;

creating the domain controller, wherein the domain controller is created in a first location based at least in part on a second location of one or more other domain controllers; and causing the domain controller to perform one or more directory operations in response to creating the domain controller.

6. The computer-implemented method of claim 5, wherein the one or more directory operations include managing access to resources corresponding to the web-based service according to information stored in a directory.

7. The computer-implemented method of claim 5, further comprising connecting the domain controller to a private network associated with a directory for performance of the one or more directory operations.

8. The computer-implemented method of claim 5, further comprising associating the domain controller with a directory to obtain information from the directory to enable performance of the one or more directory operations.

9. The computer-implemented method of claim 5, further comprising:

obtaining, by the web-based service, a second request to terminate a second domain controller;

determining, based at least in part on locations of a set of domain controllers, the second domain controller; and terminating the second domain controller.

10. The computer-implemented method of claim 5, wherein:

the request specifies a number of desired domain controllers for a private network; and the method further comprises determining, based at least in part on the number of desired domain controllers and a second number corresponding to domain controllers previously provisioned for performance of the one or more directory operations, that creation of the domain controller is to be performed.

11. The computer-implemented method of claim 5, further comprising:

detecting an issue with the domain controller;

determining, based at least in part on locations of other domain controllers, a location for a new domain controller;

launching the new domain controller in the location; and enabling the new domain controller to perform the one or more directory operations.

12. The computer-implemented method of claim 5, wherein the first location is determined according to a ranking algorithm.

13. A non-transitory computer-readable storage medium having stored thereon executable instructions that, as a result of being executed by one or more processors of a computer system, cause the computer system to at least:

obtain a request to create a domain controller on behalf of one or more users of a web-based service;

create the domain controller; and enable the domain controller to perform one or more directory operations corresponding to the web-based service in response to creating the domain controller, wherein the one or more directory operations include managing access to resources corresponding to the web-based service according to information stored in a directory.

14. The non-transitory computer-readable storage medium of claim 13, wherein the instructions further cause the computer system to:

detect an issue with the domain controller;

determine, based at least in part on locations of other domain controllers, a location for a new domain controller; and launch the new domain controller in the location to enable the new domain controller to perform the one or more directory operations.

15. The non-transitory computer-readable storage medium of claim 13, wherein the instructions further cause the computer system to determine, based at least in part on a first number of desired domain controllers and a second number corresponding to domain controllers previously provisioned for performance of the one or more directory operations, that creation of the domain controller is to be performed.

16. The non-transitory computer-readable storage medium of claim 13, wherein the instructions that cause the computer system to create the domain controller further cause the computer system to select a first location of the domain controller based at least in part on a second location of one or more other domain controllers.

17. The non-transitory computer-readable storage medium of claim 13, wherein the instructions further cause the computer system to connect the domain controller to a private network associated with a directory for performance of the one or more directory operations.

18. The non-transitory computer-readable storage medium of claim 13, wherein the instructions further cause the computer system to associate the domain controller with a directory to obtain information from the directory.

19. The non-transitory computer-readable storage medium of claim 13, wherein the instructions further cause the computer system to:

obtain a second request to terminate a second domain controller;

determine that termination of the second domain controller results in a number of remaining domain controllers being greater than a minimum threshold value for active domain controllers;

determine, based at least in part on locations of a set of domain controllers, the second domain controller; and terminate the second domain controller.

20. The non-transitory computer-readable storage medium of claim 13, wherein the executable instructions further cause the computer system to create the domain controller within a particular data zone.

* * * * *